Jan. 22, 1952     M. M. HASLETT     2,583,424
ELECTRICAL TESTER

Filed March 14, 1947     2 SHEETS—SHEET 1

INVENTOR.
Martin M. Haslett

BY *Victor J. Evans & Co.*

ATTORNEYS

INVENTOR.
Martin M. Haslett

Patented Jan. 22, 1952

2,583,424

UNITED STATES PATENT OFFICE 2,583,424

ELECTRICAL TESTER

Martin M. Haslett, Demorest, Ga., assignor to William D. Highfill, Ben Tillman Naval Base, S. C.

Application March 14, 1947, Serial No. 734,702

5 Claims. (Cl. 175—183)

1

The present invention relates to electrical testers and more particularly to testers adapted for the testing of fractional horsepower motors, switches, receptacles and similar items of electrical apparatus usually present in and around household appliances.

An object of the invention is to include in a compact and unitary device, a group of starting relays, capacitors and selective electrical connections therefor in order that the appropriate unit may be rapidly and conveniently selected.

A further object of the invention is to provide a testing apparatus in which indicating devices included in the device may be made electrically available for external testing such as testing for grounds or for electrical continuity or for determining the condition of energization of a power outlet.

From another aspect, the invention contemplates the organization into a suitable compact and portable physical arrangement of an assortment of electrical components of various standard sizes together with switching apparatus permitting the rapid selection of the correct size for replacement purposes in an appliance which is being tested.

In accordance with a feature of the invention, various switches and receptacles are provided, together with suitable test leads which are preferably connected to the testing apparatus by the use of conventional attachment plugs and receptacles. The use of these conventional connectors minimizes the problem of replacement if the external testing leads should become lost or damaged.

A further object of the invention is to provide starting facilities for motors of various standard sizes and characteristics together with measuring apparatus for observation of the line voltage and line current drawn by the motor. By the use of such separate starting facilities, it is possible to determine whether the trouble which is under investigation is in the motor itself or in the starting apparatus associated therewith.

A further object of the invention is to provide testing facilities comprising incandescent lamps adapted to serve as an approximate indication of the electrical conditions where the accuracy obtained by the use of instruments is not required.

Other and further objects will become apparent upon reading the following specification together with the accompanying drawings forming a part hereof.

Referring to the drawings:

Fig. 1 shows a schematic circuit drawing of an embodiment of the invention.

2

Figures 1, 2:
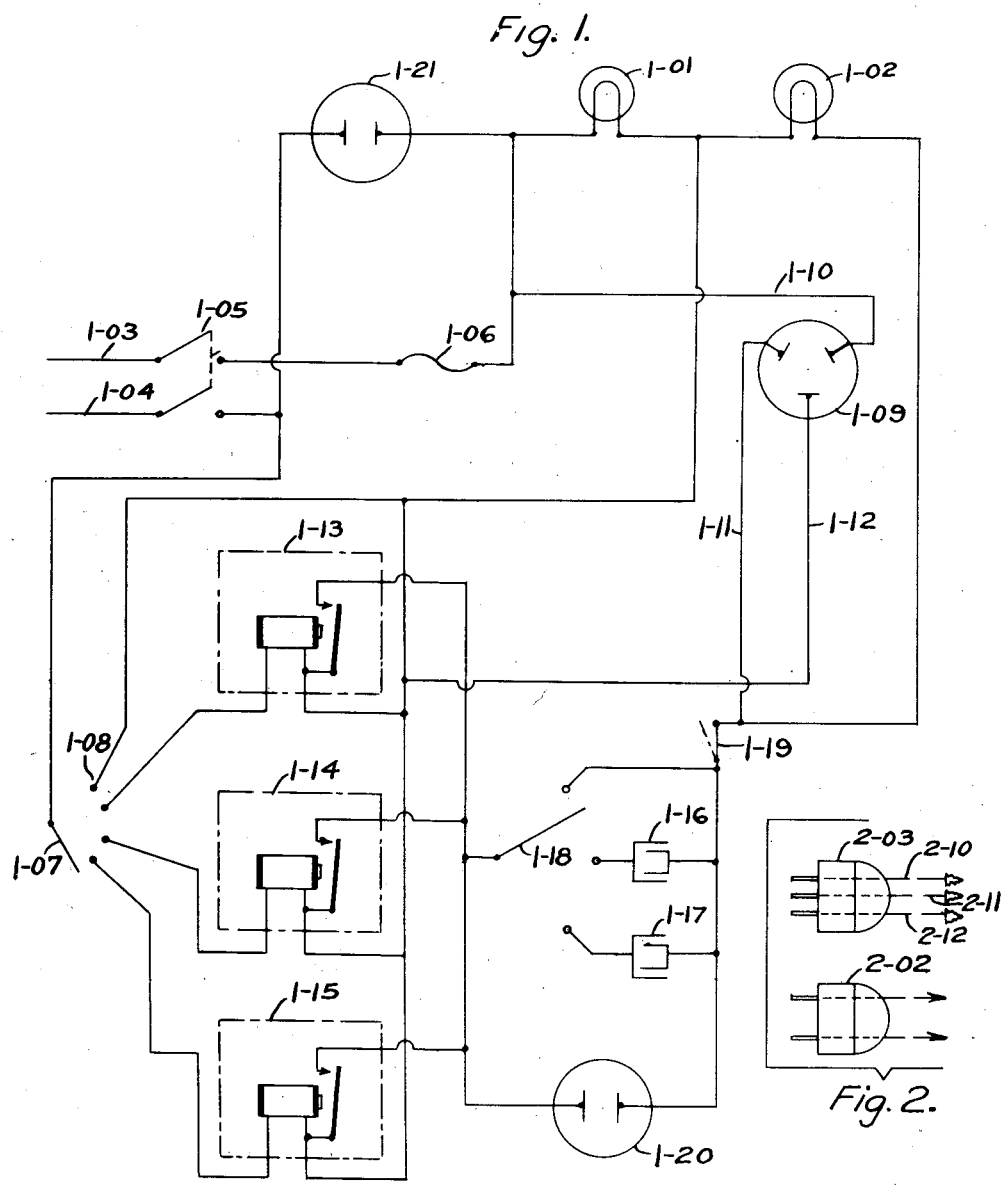
Fig. 2 shows a diagrammatic representation of external connecting apparatus for use with Fig. 1.

Referring to Fig. 1, a pair of indicating lamps 1—01 and 1—02 are provided which are preferably of the incandescent type.

Power for operation of the tester is derived from conductors 1—03 and 1—04 which may be terminated in any convenient manner such as an attachment plug (not shown) for connection to the power supply system. Double pole switch 1—05 provides for complete disconnection of the tester from the power supply. A fuse 1—06 is provided for protection against overloads or short circuits.

In making continuity tests upon apparatus not connected to the power supply, supply conductors 1—03 and 1—04 are energized and switch 1—05 is closed. Switch arm 1—07 is then turned to switch terminal 1—08. This causes lamp 1—01 to become illuminated, indicating that the tester is energized. The three conductor test plug 2—03 shown in Fig. 2 is then inserted in receptacle 1—09. By touching test leads 2—10 and 2—11 together, lamp 1—02 can be caused to light. Leads 2—10 and 2—11 are connected through plug 2—03 and receptacle 1—09 to conductors 1—10 and 1—11 respectively. Electrical continuity through any apparatus of sufficiently low internal impedance can thus be determined. Similarly, test lead 2—12 is connected to conductor 1—12 within the tester.

With the same connections as described above, it is possible to determine the presence of energy at any desired convenience outlet by attempting to energize the tester from such outlet. Upon connecting supply conductors 1—03 and 1—04 thereto, lamp 1—01 will light if energy is present. If there is no energy present lamp 1—01 will not light. This may likewise be used to check the condition of fuses by connecting conductors 1—03 and 1—04 across the fuse under test, although more convenient arrangements are included in the tester utilizing the test leads which are more readily adaptable for this purpose.

For the testing of split phase starting single phase motors the three conductor plug 2—03 is used and test lead 2—10 is connected to the common lead, lead 2—11 is connected to the starting winding of the motor and conductor 2—12 is connected to the running winding. The tester is kept deenergized. The motor control associated therewith is then manipulated to cause operation of the motor. Test leads 2—10 and 2—11, and corresponding conductors 1—10 and 1—11 are thus connected across the starting circuit of the motor. If the overload contacts are closed, this circuit will be energized. Conductors 1—11 and 1—12, which are connected to lamp 1—02, are thus connected across the contacts which control energization of the running winding. If lamp 1—01 lights, then the overload contacts of the motor control are closed but if lamp 1—01 fails to light the overload contacts are open. If lamp 1—02 lights, then the starting contacts have failed to close. Lamp 1—02 will not burn during the short starting period but will be lighted during the running period. Under these test conditions, energy for operation of the motor and the indicating lamps is derived from the usual source from which the motor is normally operated, and it is subjected to the action of the motor control permanently associated with the motor under test.

If the motor fails to start, indicating that there may be trouble either in the motor or in the control, then the separate control equipment included in the tester may be used to localize the trouble. The motor power supply is then disconnected and the tester is energized as described above. The three conductor plug, 2—03 is connected to the motor as previously described. The tester comprises a plurality of starting relays of assorted standard sizes. Switch arm 1—07 is turned to select the size appropriate for the motor under test. Similarly, a plurality of assorted capacitors of various standard values 1—16 and 1—17 are included in the tester and switch arm 1—18 is turned to select the proper capacitor. Switch 1—05 is then closed. Lamp 1—01 will indicate the condition of the overload switch of the starting relay of the tester, being lighted if the overload contacts are open, and extinguished if they are closed. Lamp 1—02 will similarly indicate the condition of the starting contacts. If the motor hums but fails to start switch 1—19, which is normally in the closed position, is then opened and if lamp 1—02 lights it indicates electrical continuity of the starting and running windings of the motor under test. The rotor of the motor may possibly be blocked by a mechanical fault. The motor may also be checked for continuity and possible grounds as described above.

For testing electric range switches, the three conductor test plug 2—03 may be used. These switches are ordinarily four position switches with off, low, medium and high positions controlling a pair of heating units of approximately equal power consumption. The switch changes from a series connection of both units, to a single unit, to both units in multiple, as the switch is turned from low to medium to high. By connecting test lead 2—12 to the common side of the range unit, lamps 1—01 and 1—02 will be connected across the respective heating units and will be lighted in accordance with the voltages applied thereto in the various positions of the range switch.

By the use of two conductor plug 2—02, and receptacle 1—20 any one of the capacitors may be selected by switch lever 1—18 and made available at the two test leads of plug 2—02. Where a defective capacitor is suspected, the test leads of plug 2—02 are connected in its place, and with the test set deenergized, the appropriate capacitor is selected by means of switch 1—18. If the test capacitor causes correct operation, then the trouble has been localized in the capacitor which was replaced by the test capacitor.

A convenience outlet 1—21 is included in the test set for the connection of any desired appliance.

Figures 3, 4:
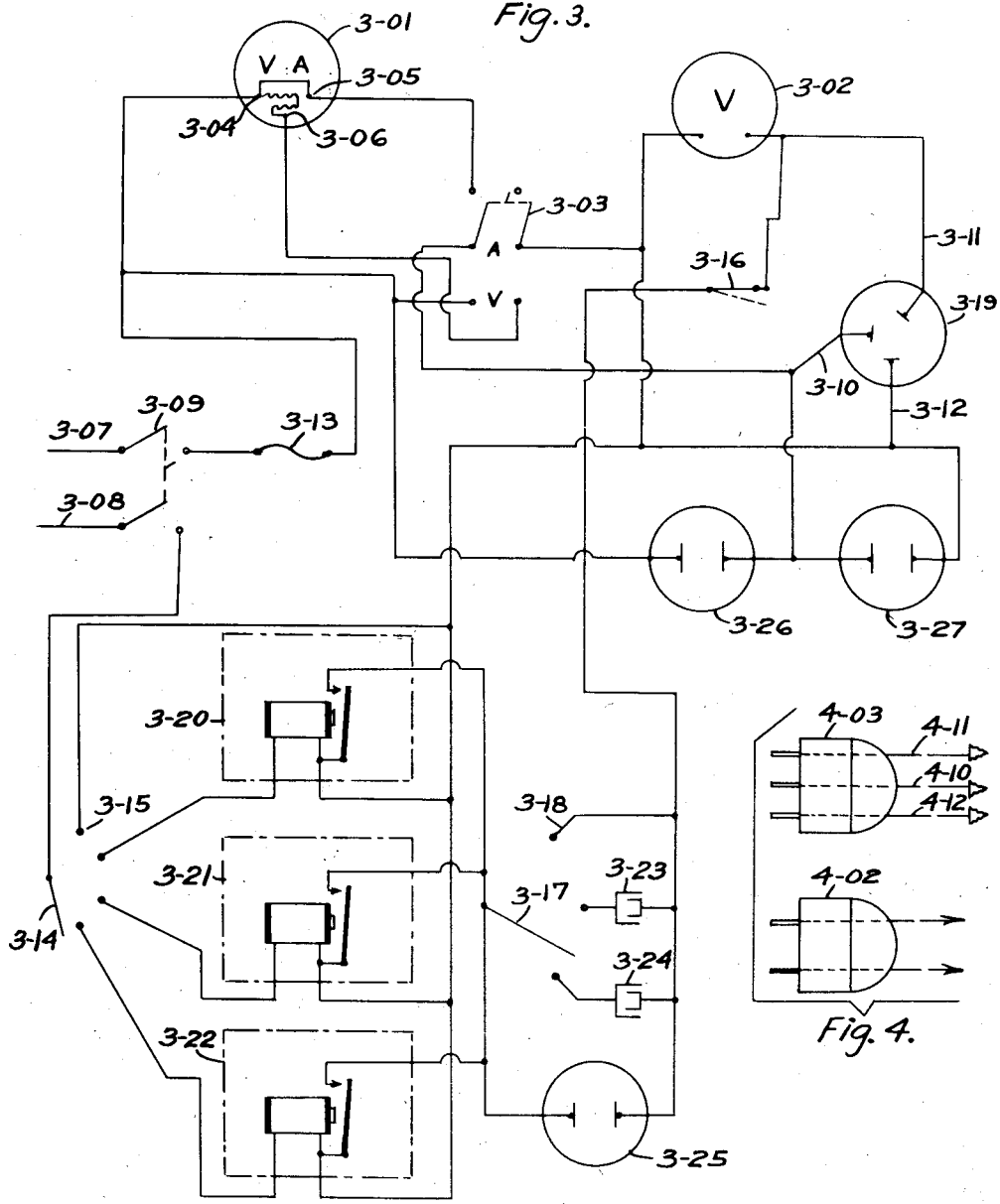
Fig. 3 shows a schematic circuit drawing of a modification of the invention.
Fig. 4 is a diagrammatic representation of external connecting apparatus for use with Fig. 3.

Referring to Fig. 3, a modification of the invention is shown in which the test lamps have been replaced by electrical measuring instruments. 3—01 is a combined volt-ammeter and 3—02 is a voltmeter. Double pole double throw switch 3—03 is connected to cause meter 3—01 to indicate voltage in the downward position and to indicate current in the upward position. Accordingly, terminal 3—04 is the common terminal and terminals 3—06 and 3—05 are the voltage and current terminals respectively.

For testing continuity and for checking for grounds, meter 3—02 is used. The apparatus to be tested is disconnected from the power supply. The tester is energized by connecting supply conductors 3—07 and 3—08 to the current supply and closing double pole double throw switch 3—09. Fuse 3—13 is provided for protection against overloads and short circuits as in Fig. 1. Switch 3—03 is placed in the downward position and switch arm 3—14 is turned to contact 3—15. Switch 3—16 is normally left in the closed position. Switch arm 3—17 is turned to an off position. By touching test conductors 4—11 and 4—12 together with three conductor plug 4—03 inserted in receptacle 3—19, meter 3—02 will read the line voltage. Thus, any desired piece of apparatus may be checked for continuity and for grounds within the sensitivity limits of voltmeter 3—02 which sensitivity is of importance only in the case of apparatus of high internal impedance compared with the internal resistance of the voltmeter.

To determine the presence of current at a convenience outlet or to check the voltage being delivered to such outlet, neither of the test plugs shown in Fig. 4 is used. The tester is energized as above, and switch 3—03 is turned to its down position with switch arm 3—14 on position 3—15. With switch 3—09 closed, volt-ammeter 3—01 will indicate the line voltage being applied to the tester, which in turn is derived from the outlet under test.

In testing the operation of a split phase motor, as described for Fig. 1, test leads 4—10, 4—11 and 4—12 are connected to the common, starting and running terminals respectively of the motor under test. With plug 4—03 inserted in tester receptacle 3—19, and with the tester deenergized the voltmeter indications of instruments 3—01 and 3—02 will correspond to the lamp indications 1—01 and 1—02 respectively of Fig. 1, except that quantitative indications will be available.

A plurality of starting relays 3—20, 3—21 and 3—22 are provided as in the case of Fig. 1, together with an assortment of capacitors 3—23 and 3—24. These are connected for use as described for Fig. 1, receptacle 3—25 serving for capacitor substitution testing.

Operation is similar to that described for Fig. 1, except that by throwing switch 3—03 to its upward position the current delivered through conductor 3—07 may be measured without more than a momentary interruption incidental to the switching action of switch 3—03.

Receptacles 3—26 and 3—27 are provided for making measurements of voltage and current consumption of apparatus to be tested. Receptacle 3—26 makes the ammeter winding of volt-ammeter 3—01 available for external use subject to the control of switch 3—03. Switch 3—03 permits the protection thereof during starting or in the event of an unexpected short circuit, using two conductor test plug 4—02. In the case of a device equipped with the usual attachment plug and cord, receptacle 3—27 is used.

While I have described what I believe to be the best embodiments of my invention, I do not wish to be limited thereto but by the appended claims.

I claim:

1. A tester for electrical appliances comprising a receptacle for receiving a plug of an electrical appliance, a pair of leads for connection to a power supply, a double pole switch for connecting the input of said power supply and a double pole switch for controlling the input of said power supply, connections between said leads and said switch, a connection from one pole of said switch to the movable contact of a multi-pole switch, a plurality of relays connected to the fixed contacts of said multi-pole switch, an indicating lamp connected between the second pole of said double throw switch and one fixed contact of said multi-pole switch, a connection between said indicating lamp and said receptacle, suitable circuits connecting the said relays, said indicating lamp and receptacle, a second indicating means in the circuits to show that the circuit between the indicating lamp and relays is complete, power supply leads in the circuit from the double pole switch to the receptacle, and the switch between the power supply leads and circuit adapted to disconnect said tester from said power supply.

2. A tester for electrical appliances comprising a receptacle for receiving a plug of an electrical appliance, a plurality of relays, circuits connecting said relays with said receptacle, a plurality of capacitors, suitable circuits connecting the said capacitors, to the circuit for said relays and receptacle, indicating means in the circuits between said relays and said receptacle, to show when the circuit is closed, power supply leads extended from the circuits between the indicating means, relays and capacitors, and a switch between the said power supply leads and circuit to control the import of said supply to said tester.

3. A tester for electrical appliances comprising a receptacle for receiving a plug of an electrical appliance, a plurality of relays, circuits connecting said relays with said receptacle, a plurality of capacitors, suitable circuits connecting the said capacitors, to the circuit for said relays and receptacle, indicating means in the circuits between said relays and said receptacle to show when the circuits are closed, power supply leads extended from the circuits between the indicating means, relays and capacitors, a switch between the said power supply leads and circuits between the indicating means, relays and capacitors, a voltmeter in the circuit between the capacitors and receptacle and a combination volt-ammeter in the circuit between said power supply leads and said receptacle.

4. A tester for electrical appliances comprising a receptacle for receiving a plug of an electrical appliance, a plurality of relays, circuits connecting said relays with said receptacle a plurality of capacitors, suitable circuits connecting the said capacitors, to the circuits for said relays and receptacle, indicating means in the circuits between said relays and said receptacle to show when the circuits are closed, power supply leads extended from the circuits for said relays and said receptacle, a switch between the said power supply leads and to said last circuits, a voltmeter in said circuits between said receptacle and said power supply leads and said relays and a combination volt-ammeter in said circuit between said power supply and said receptacle, said voltmeter being connected in the circuit whereby the meter is connected across the line only when a relay is closed.

5. A tester for electrical appliances comprising a receptacle for receiving a plug of an electrical appliance, a plurality of relays, circuits connecting said relays with said receptacle, a plurality of capacitors, suitable circuits connecting the said capacitors, the circuits for said relays and receptacle, indicating means in the circuits between said relays and said receptacle to show when the circuits are closed, power supply leads extended from the circuits for said indicating means, relays and capacitors, a switch between the said power supply leads and said last circuits, a voltmeter in the circuits between the capacitors and receptacle and a combination volt-ammeter in the circuit between the power supply leads and the receptacle, said indicating means including a light bulb and said light bulb and voltmeter connected in the circuits whereby the light bulb is lighted and the voltmeter actuated when the thermostat of an electric iron is closed only.

MARTIN M. HASLETT.

REFERENCES CITED

The following references are of record in the file of this patent:

UNITED STATES PATENTS

| Number | Name | Date |
| --- | --- | --- |
| 1,077,626 | Mershon | Nov. 4, 1913 |
| 1,707,423 | Bailey | Apr. 2, 1929 |
| 1,828,724 | Yost | Oct. 20, 1931 |
| 1,944,090 | Luhens | Jan. 16, 1934 |
| 1,984,493 | Pierce | Dec. 18, 1934 |
| 2,018,272 | Lunas | Oct. 22, 1935 |
| 2,304,513 | Stearns | Dec. 8, 1942 |
| 2,442,771 | Kirkpatrick | June 8, 1948 |

OTHER REFERENCES

Publication, "Electric Motor Repair," by Rosenberg, Murray Hill Book, Inc., New York, 1946. Pages 19 and 44 in the illustrations section.